Nov. 6, 1951 C. A. GUSTAFSON 2,573,765
LATCH MECHANISM FOR CARRY TYPE SCRAPER EJECTORS
Filed May 24, 1947 4 Sheets-Sheet 1
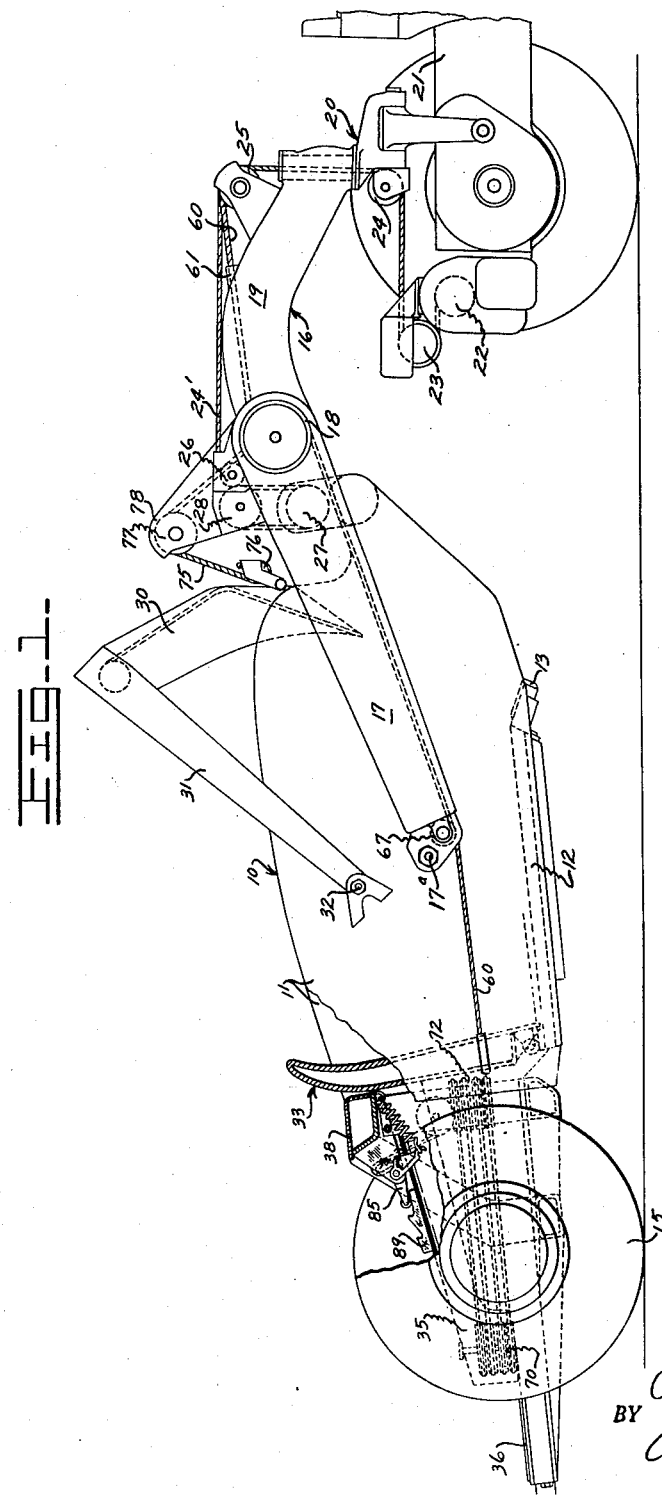
INVENTOR.
Carl A. Gustafson
BY
Charles M. Fryer
ATTORNEY.

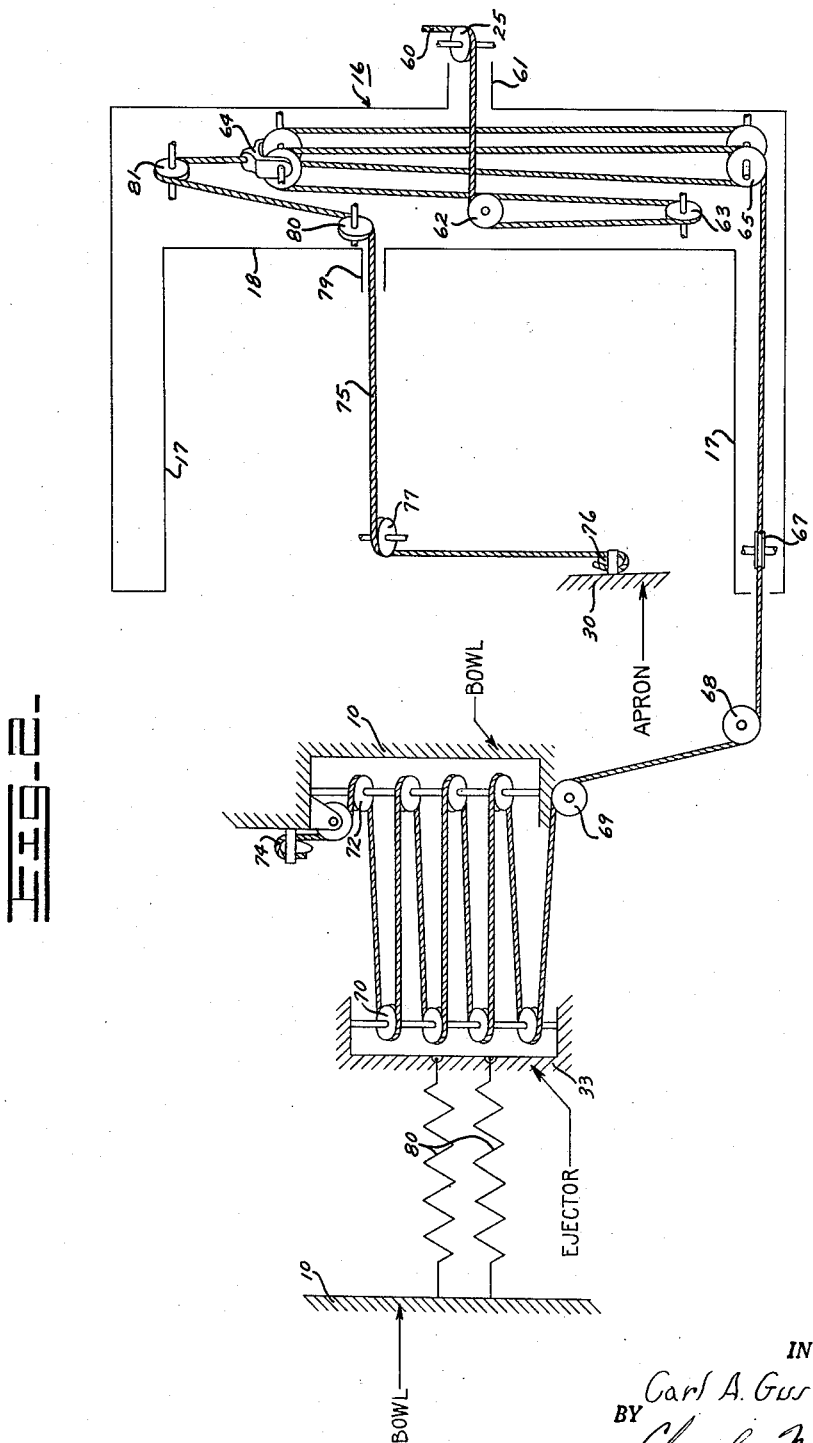

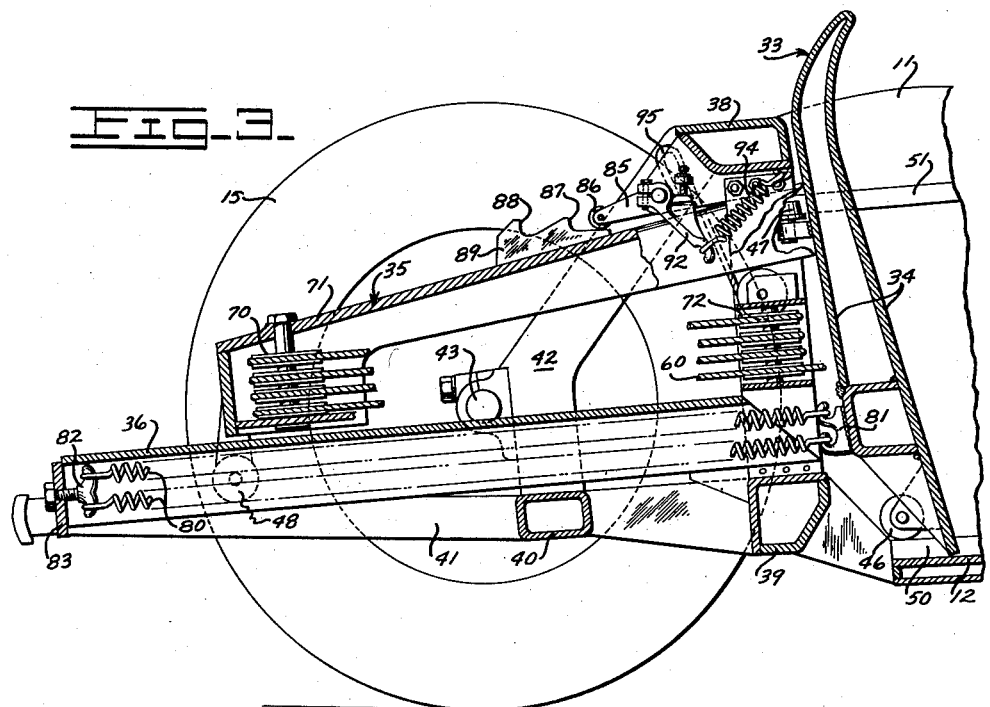
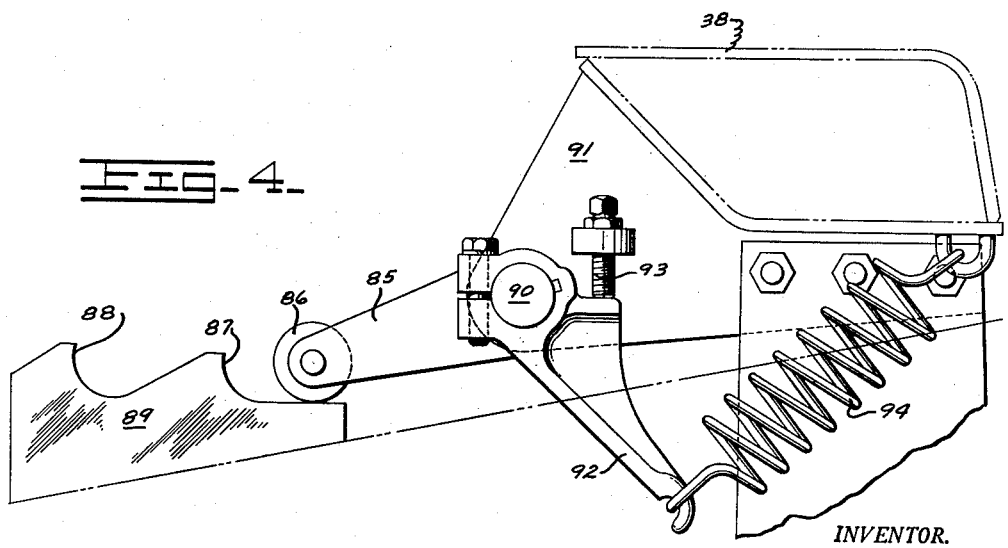

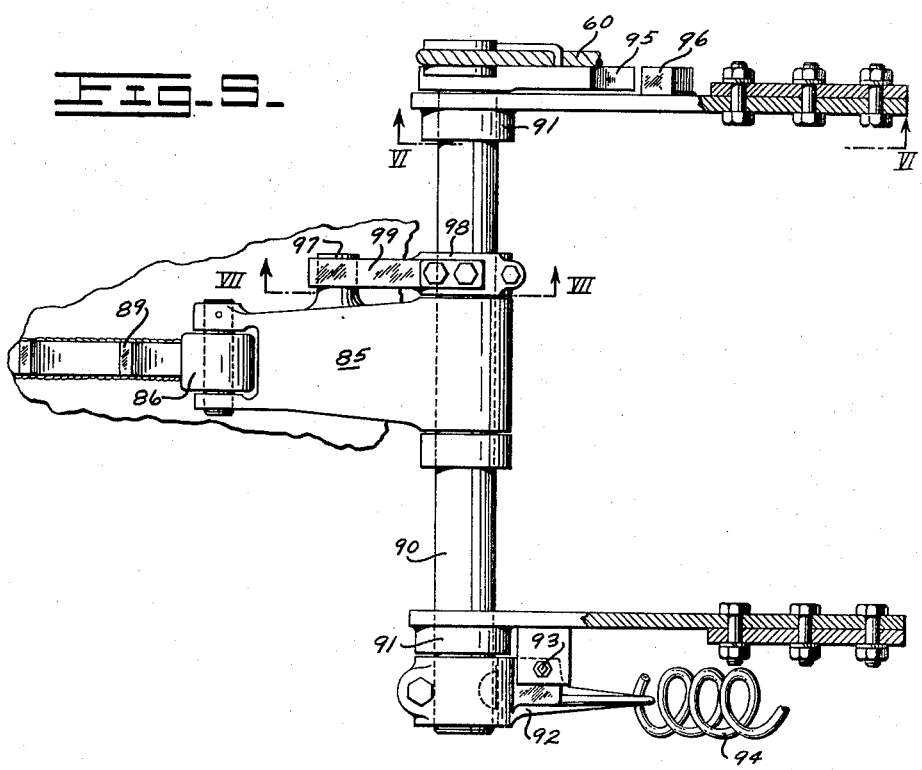
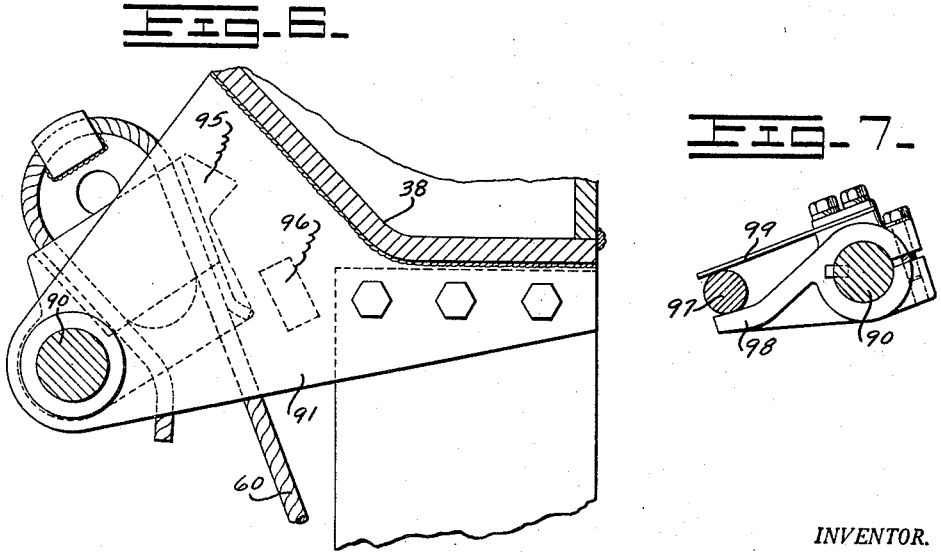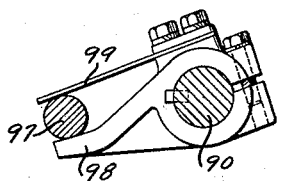

Patented Nov. 6, 1951

2,573,765

UNITED STATES PATENT OFFICE 2,573,765

LATCH MECHANISM FOR CARRY TYPE SCRAPER EJECTORS

Carl A. Gustafson, Peoria, Ill., assignor to Caterpillar Tractor Co., San Leandro, Calif., a corporation of California Application May 24, 1947, Serial No. 750,284

2 Claims. (Cl. 37—129)

This invention relates to control mechanism for earth moving scrapers and the like and particularly to such mechanism on a scraper having a bowl with a movable front apron and a movable ejector adapted to be selectively controlled by a single cable.

One type of scraper now commonly employed for collecting and moving large quantities of earth and the like comprises a large bowl or body member with a draft connection by means of which it may be connected to and drawn by a tractor unit. The bowl is provided with a scraper edge adjacent its forward portion and may be lowered to bring the scraping edge into contact with the ground to effect collection of earth deposited in the bowl. The rear wall of the bowl is formed as an ejector and is movable forwardly to empty the bowl of its contents when it has been drawn to a proper place for discharge of earth that has been collected. The front of the bowl is normally open for the reception or collection of earth and is provided with a gate-like device usually referred to as an apron which can be swung downwardly or closed during transportation of a load of earth and which is usually partially closed during the scraping or loading operation to control the filling of the bowl with earth in a manner well known to those familiar with this art.

The operation of the ejector and of the apron as well as the operation of raising and lowering the bowl and its scraping edge with relation to the ground are all desirably controlled by the operator of the tractor and control means are conveniently provided for this purpose including cables leading between the tractor and the scraper. The cables are usually wound upon drums carried by the tractor and adapted to be rotated by a suitable power take-off shaft so that the cables may be taken in or payed out as required.

In this kind of scraper a single cable controlled from the tractor is employed for raising the apron and for advancing the ejector. The ejector is normally held in a retracted position by resilient mechanism such as a nest of springs or a pneumatic device. The arrangement is such that by exerting a pull on the single cable the apron is first raised and then with the apron fully raised the ejector is advanced to discharge the contents of the bowl through its owen front end. This requires heavy springs in order to retain the ejector in its retracted position during manipulation of the apron so that when the ejector is advanced the pull required to overcome the tension of the springs is excessive and the springs are often over-stressed.

It is, therefore, an object of this invention to provide a scraper of the kind described wherein the ejector return springs are relatively light and flexible to afford just sufficient force to retract the ejector after it has been advanced and to provide means separate from the springs to latch the ejector in its retracted position during operation of the front apron. A further object of the invention is to provide a scraper with an apron and an ejector, and a latch means on the ejector to hold it in its retracted position, the latch being rleasable only when the apron has been fully raised. Further and more specific objects of the invention and the manner in which these objects are attained will be apparent from the following specification wherein the scraper embodying the invention is disclosed in detail.

In the drawings:

Fig. 1 is a view in side elevation with parts in section of a scraper embodying the present invention and illustrating the scraper as drawn by a tractor the rear portion of which is also shown;

Fig. 2 is a schematic view illustrating the cable control of the apron and ejector of the scraper shown in Fig. 1;

Fig. 3 is an enlarged vertical section through the rear portion of the scraper illustrated in Fig. 1;

Fig. 4 is an enlarged detail of a latch mechanism shown in Fig. 3;

Fig. 5 is an enlarged fragmentary view illustrating the latch mechanism in plan;

Fig. 6 is an enlarged section taken on line VI—VI of Fig. 5; and

Fig. 7 is a section taken on line VII—VII of Fig. 5.

Referring first to Fig. 1 of the drawings, a scraper of the type with which the present invention is used is generally indicated at 10 as having a main bowl portion including a pair of spaced side plates 11 and a bottom 12. The forward edge of the bottom 12 is provided with a scraping blade 13. The scraper bowl is supported adjacent its rear end by a pair of ground engaging wheels 15 and by a pivoted draft connection, generally indicated at 16, at its forward end. The draft connection 16 comprises a pair of spaced hollow arms 17 pivotally connected one to each side of the bowl 10 as by pins 17a. At their forward ends, arms 17 are connected by a cross member 18 of hollow tubular construction, and a draft arm 19 extends forwardly from the cross member 18 and is adapted to be connected at its forward end with a suitable universal pivotal connection 20 carried by the rear end of a tractor partially shown at 21. The tractor 21 also carries a cable control unit of conventional construction which takes power from a rear power take-off shaft of the tractor and includes a pair of cable-winding drums one of which is indicated in dotted lines at 22. The function of the drums 22 is to take in or pay out cables for controlling the operation of the scraper. For example, in the present case, the scraper bowl 10 is adapted to be raised or lowered about the axis of its supporting wheels 15 in order to control the position of the blade 13 with respect to the ground. This raising and lowering of the scraper is accomplished by a cable 24' secured to and wound upon one of the drums 22. The cable 24' leads from its drum 22 over a cable-laying sheave indicated at 23, then around a guide sheave 24 and upwardly through the hollow center of a part of the universal connection 20 and over a guide sheave 25 disposed above such connection. From the guide sheave 25, the cable 24' leads rearwardly to pass over a guide sheave 26 on the draft connection and is then led around two groups of sheaves, one indicated at 27 as carried by the forward end of the scraper bowl and the other indicated at 28 as carried by the draft connection, and is finally secured at its end to the draft connection adjacent the sheaves 28. Consequently, the forward end of the bowl can be raised or lowered upon taking in or paying out of cable 24' and as the bowl raises or lowers, it will pivot about the axis of its supporting wheels 15. Pivotal movement will also take place about the pins 17a of arms 17 and at the universal draft connection 20.

In operation, and when the bowl is to be filled, it is lowered until its scraping edge touches the ground and, as the tractor draws the scraper forwardly, the earth engaged by the scraping edge will be deposited in the bowl in the usual manner. When the bowl is filled, or when a particular scraping operation is completed, it may be raised by manipulation of the cable 24' and will then serve as a conveying or transporting unit drawn by the tractor for carrying the earth or other material contained by the bowl to any desired point for discharge.

The bowl is provided with a front gate or apron, indicated at 30, which may be closed to prevent the earth from spilling as it is being transported. The apron also serves the purpose, when partially closed, of regulating the amount of earth that can pass into the bowl over the scraper edge during a scraping operation. This apron 30 is carried by a pair of arms 31 pivoted as at 32 to the sides 11 of the bowl so that it may be swung upwardly to its open position as illustrated in Fig. 1 or lowered to a closed position. The position of the apron 30 is also controlled by a cable adapted to be manipulated by the operator of the tractor 21 in a manner presently to be described.

The rear wall of the scraper bowl 10 is generally indicated at 33 and is supported to move forwardly with relation to the sides and bottom of the bowl to serve as an ejector for the purpose of discharging the contents of the bowl forwardly over the edge of the blade 13 when the apron 30 is in its raised position. The ejector which serves as the rear wall of the bowl when it is in its retracted position is best illustrated in Fig. 3 of the drawings as being made of spaced reinforced plates 34. The ejector is provided with a rearwardly extending carriage 35, shown as an inverted U-shaped beam. This carriage 35 is supported for reciprocating motion with relation to the scraper bowl in a guide frame 36 which extends rearwardly of the bowl. Guide frame 36 forms a part of the scraper bowl and is supported by a pair of transverse beams 38 and 39 extending between and secured to the sides 11 of the bowl, further support being provided by transverse beam 40 and a pair of longitudinal beams 41 (Fig. 3). A pair of similar downwardly inclined beams 42 extend rearwardly from beam 38 and meet with transverse beam 40 and longitudinal beams 41 as shown, the beams 42 serving to support axle assemblies 43 of wheels 15.

The ejector 33 and its carriage 35 are adapted to be moved forwardly with respect to the bowl 10. The ejector is guided in such movement by rollers 46, 47 and 48. Rollers 46 and 47 engage rails 50 and 51 respectively which form a part of the scraper bowl while the rollers 48 engage suitable rails that form a part of the guide frame 36.

It is desirable that the operation of the apron and ejector be individually controlled to the extent that the apron 30 may be raised and lowered independently of, or at least without advancing the ejector 33. The ejector should also be capable of operation or of being advanced to discharge the contents of the bowl while the apron is raised and without moving it from its fully raised position. To accomplish this, a single cable is provided which may be paid out or taken in by the operator of the tractor and upon taking in on this cable the apron 30 is first raised. When it obtains its fully opened position, as illustrated in Fig. 1, and only after it has obtained such position, continued taking in or pulling upon the same cable effects advancing of the ejector 33 to discharge the contents of the bowl. One of the advantages of this manner of operation is that as the scraper is engaging the ground and the bowl is being filled, the apron may be raised and lowered to vary the opening above the blade 13 and thus to determine the rate and the manner in which the earth being scraped enters the bowl. This adjustment of the apron may be accomplished entirely independently of the ejector 33 so that it does not cause the ejector to advance forwardly in the bowl. Furthermore, after the apron is fully raised and the ejector starts its forward movement for the purpose of ejecting the contents of the bowl, there are times when large slabs of rock or other hard materials contained by the bowl become wedged between the blade and the lower edge of the apron 30, and the operator must permit retraction of the ejector 33, at least partially, to permit such obstacles to settle or readjust themselves in the bowl before they can be discharged. This can be accomplished without disturbing the position of the apron.

The manner in which this mechanism operates is most clearly illustrated in the diagrammatic view shown in Fig. 2 and must be understood in order to appreciate the advantage of the present invention. In Fig. 2 the cross member 18 and the arms 17 are indicated in simple outline. A cable 60, one end of which is secured to one of the drums 22 of the tractor, leads over guide sheaves 24 and 25 similar to the manner of cable 24' and enters the tubular cross member 18 through a tube 61, shown in Figs. 1 and 2 of the drawings as extending forwardly through the structure of the draft connection 19. Within the drum 18 the cable 60 passes over a guide sheave 62, then over a guide sheave 63, after which it is trained over the sheaves in a movable or sliding block 64 and the sheaves in a stationary block 65. As the cable 60 is taken in, it tends to advance the block 64 toward the block 65 with a mechanical advantage determined by the number of strands disposed between the two blocks. After passing through the sheaves on the blocks 64 and 65, the cable 60 is carried downwardly through one of the side arms 17 of the draft assembly and passes outwardly through the rear end of the arm over guide sheave 67 and then over sheave 68, and then inwardly of the bowl behind the ejector 33 where it is trained over a sheave 69. From the sheave 69 the cable is led around a series of sheaves 70 secured in a rearwardly extending housing 71 of the ejector (Fig. 3) and a series of sheaves 72 secured with relation to the bowl. The end of the cable is made fast, as indicated at 74, to an anchor on the bowl. Thus, taking in or pulling on the cable 60 shortens the distance between the sheaves 70 on the ejector and the sheaves 72 on the bowl so that the ejector will tend to move forwardly in the bowl.

The apron 30 is raised by a pull on a cable 75 which, as shown in Fig. 1, is secured to the apron by an anchor 76, and leads over a guide sheave 77 disposed in a sheave tower 78 on the draft assembly and then passes into the cross member 18 through an opening 79, wherein it is guided over sheaves 80 and 81 and secured at its end to the sliding block 64. Because of the connection just described, any taking up or pulling on the cable 60 tends to shorten the distance between the blocks 64 and 65 and thus, through the cable 75 connected to the block 64, to raise the apron 30. The same pull on the cable 60 tends to shorten the distance between the sheaves 70 on the ejector and sheaves 72 on the bowl and thus to advance the ejector to discharge the contents of the bowl. Raising of the apron is resisted by gravity, and forward movement of the ejector is resisted by spring action. Taking into consideration the normal resistance to the operation of the apron and the ejector and also the mechanical advantage that is obtained by the cables 60 passing over the blocks which control the operation of each of these members, the system is balanced in such a manner that the apron will raise more easily or with less force applied to the cable 60 than is required for advancing the ejector. Consequently, when a pull is applied to the cable 60, the block 64 will be advanced toward the block 65 as far as possible and will effect full upward movement of the apron 30 before the continued pull on the cable is effective to advance the ejector. Furthermore, as the ejector is returned by spring action upon paying out of the cable, it should attain its fully retracted position before the apron 30 starts to close.

The springs employed for retracting the ejector are shown at 80 in Fig. 3 as disposed within the guide frame 36. They are secured to an anchor member 81 on the ejector at their forward ends and to a similar anchor 82 at their rear ends. The anchor 82 is carried by a plate 83 spanning the outer ends of the beams 40 of the scraper bowl.

Difficulties have been encountered in the operation of a scraper of this kind because of the fact that the springs 80 must be extended a considerable distance to accommodate the forward movement of the ejector, which in a large scraper sometimes amounts to several feet. If these springs are stiff enough to retain the ejector in its retracted position during raising and lowering operations of the apron, it is found that they are over-stressed or extended beyond their elastic limit when the ejector is moved forwardly throughout the full extent of its intended travel. Consequently, according to the present invention the springs 80 are made considerably lighter than is usual practice and just sufficiently strong to ensure the return of the ejector from its advanced position but not to overcome the tendency of the ejector to be pulled forwardly by the cable 60 as the apron is being raised and lowered.

In order to prevent operation of the ejector by a pull on the cable except when the apron is in its fully opened position a latch member, shown at 85 in Fig. 3, is carried by the scraper bowl and has a roller 86 at its end engageable with either of notches 87 or 88 on a latch plate 89 secured to and carried by the housing 71 which is a part of the ejector. The latch 85, best illustrated in Figs. 4 and 5, is carried on a shaft 90 rotatably supported in brackets 91 secured to and extending rearwardly from the cross member 38 of the scraper. A lever 92 is nonrotatably secured to one outer end of the shaft 90 and is urged in a counterclockwise direction against an adjustable stop 93 by means of a spring 94 anchored at one end relative to the scraper bowl. The spring 94, therefore, serves to retain the latch in a down position where it will intercept the notch 87 on the plate 89 to prevent the ejector from being pulled forwardly.

In order to raise the latch 85 and permit the ejector to be pulled forwardly when the apron has attained its fully raised position, the end of the cable 60 instead of being anchored to the bowl as shown at 74 in Fig. 2 is anchored to a lever 95 fixed to one end of the shaft 90 and limited in swinging movement by a fixed stop 96. When the apron is raised and a sufficient tension is applied to the cable 60 the lever 95 is drawn downwardly, as illustrated in Fig. 6, or in a clockwise direction to rotate the shaft 90 against the tension of the spring 94, thus raising the latch 85 and permitting the ejector to move forwardly under influence of the cable 60 in the manner previously described. When the tension on the cable 60 is released and the ejector is retracted by its retracting springs 80, the latch 85 will, of course, assume its normal downward position and the roller 86 on its end enables it to roll over the inclined approaches to the notches 87 and 88 until it again assumes the position illustrated in Fig. 3. As some clockwise direction of the lever is necessary in order for it to pass over the notched plate 89 upon retraction of the ejector and, as the spring 94 is too stiff to permit this action with ease, the lever 85 is preferably mounted for limited rotation on the shaft 90 but has an outwardly projecting lug 97 on one side (see Figs. 5 and 7) engageable with a stop member 98 secured against rotation on the shaft 90. A soft spring 99 carried by the stop member 98 overlies the projection 97 and permits the lever to move upwardly or in a counter-clockwise direction sufficiently to enable the latch plate to pass beneath it.

With the construction described relatively light springs may be employed for retracting the ejector mechanism so that they will not be overstressed or permanently distorted as the ejector is advanced. At the same time the raising and lowering of the apron, which places some stress on the cable 60, will not effect forward movement of the ejector unless and until the apron has attained its uppermost position and the pull on the cable 60 is sufficient to overcome the tension of the spring 94, the action of which normally retains the latch 85 in its latching position. It is possible in some cases that the ejector will not be fully retracted by the springs 80, as, for example, when a large rock or other material becomes lodged in the scraper bowl behind the ejector. In this event the latch 85 may come to rest in the advanced notch 88 rather than in the notch 87 and will still serve to retain the ejector against undesirable forward movement during manipulation of the front apron. Ordinarily, however, when this occurs the load of the earth in the bowl as it is being filled urges the ejector rearwardly with sufficient force to overcome whatever obstructs its rearward movement and the latch 85 will then come to rest behind the proper notch 87.

I claim:

1. In a scraper having a bowl for the reception of earth and ejector mechanism for discharging earth from the bowl, latch means for holding the ejector mechanism in inoperative position comprising a shaft rotatably carried by the bowl, a latch lever supported for limited swinging movement on the shaft and engageable with the ejector, resilient means interposed between the shaft and latch lever to bias the lever toward its engaged position, a second resilient means tending to rotate the shaft and latch lever toward said engaged position, and means to turn the shaft in opposition to said second resilient means for releasing the latch.

2. In a scraper having a bowl for the reception of earth and ejector mechanism for ejecting earth from the bowl, means to latch the ejector in an inoperative position comprising, a rotatable shaft on the bowl, a latch lever supported for limited swinging movement on the shaft, a notched plate on the ejector mechanism engageable by said lever, a spring acting between the shaft and the bowl to bias the shaft and lever toward the position of latch engagement, means operable upon the application of force to operate the ejector to rock the shaft in opposition to said spring, and resilient means acting between the shaft and the lever to permit retraction of the lever sufficient to enable latching action without flexing said spring.

CARL GUSTAFSON.

REFERENCES CITED

The following references are of record in the file of this patent:

UNITED STATES PATENTS

| Number | Name | Date |
|---|---|---|
| 2,148,359 | LeBleu | Feb. 21, 1939 |
| 2,168,319 | Brodersen et al. | Aug. 8, 1939 |
| 2,172,672 | Daniels | Sept. 12, 1939 |
| 2,383,978 | LeTourneau | Sept. 4, 1945 |